United States Patent
Carreiro et al.

(10) Patent No.: US 7,635,531 B1
(45) Date of Patent: Dec. 22, 2009

(54) SELF CONTAINED FUEL SYSTEM FOR SOLID OXIDE FUEL CELL

(75) Inventors: Louis G. Carreiro, Westport, MA (US); A. Alan Burke, Middletown, RI (US); Steven P. Tucker, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 716 days.

(21) Appl. No.: 11/208,125

(22) Filed: Aug. 18, 2005

(51) Int. Cl.
*H01M 8/00* (2006.01)
*H01M 8/04* (2006.01)
*H01M 8/10* (2006.01)
*H01M 2/00* (2006.01)
*H01M 2/02* (2006.01)

(52) U.S. Cl. ............................ 429/13; 429/17; 429/30; 429/34

(58) Field of Classification Search .................. 429/12, 429/17, 19, 30, 31, 32, 33, 34, 13; 423/165
See application file for complete search history.

(56) References Cited

U.S. PATENT DOCUMENTS

| | | | |
|---|---|---|---|
| 3,498,767 A | 3/1970 | Foster | |
| 3,664,134 A | 5/1972 | Seitz | |
| 3,982,391 A | 9/1976 | Reynolds | |
| 4,257,232 A | 3/1981 | Bell | |
| 4,384,551 A | 5/1983 | Scott | |
| 5,100,642 A * | 3/1992 | Baycura | 423/648.1 |
| 6,294,148 B1 * | 9/2001 | Bunger et al. | 423/636 |
| 2004/0086770 A1 * | 5/2004 | McClelland et al. | 429/39 |
| 2004/0091757 A1 * | 5/2004 | Wang et al. | 429/19 |
| 2004/0197635 A1 * | 10/2004 | Ito et al. | 429/34 |
| 2005/0175878 A1 * | 8/2005 | Rusek | 429/30 |
| 2005/0260468 A1 * | 11/2005 | Fripp et al. | 429/19 |
| 2006/0127714 A1 * | 6/2006 | Vik et al. | 429/19 |

FOREIGN PATENT DOCUMENTS

WO   WO 2007005767 A1 *   1/2007

* cited by examiner

*Primary Examiner*—Dah-Wei D Yuan
*Assistant Examiner*—Stephan Essex
(74) *Attorney, Agent, or Firm*—James M. Kasischke; Jean-Paul A. Nasser; Michael P. Stanley

(57) ABSTRACT

A power source for an unmanned undersea vehicle with increased energy density is described that employs a self-contained fuel system to address carbon dioxide evolution. A solid oxide fuel cell serves as the power source in the self-contained fuel system. In combination with the solid oxide fuel cell, the system comprises a chemical composite that is combined with water to create both a hydrocarbon fuel for the solid oxide fuel cell and a water-soluble byproduct. The byproduct is then combined with the carbon dioxide gas generated by the fuel cell to create a storable solid precipitate.

16 Claims, 1 Drawing Sheet

SELF CONTAINED FUEL SYSTEM FOR SOLID OXIDE FUEL CELL

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates to fuel cells, and more specifically to a novel fuel system designed for use with a solid oxide fuel cell for powering unmanned underwater vehicles.

(2) Description of the Prior Art

The most logical choice of an energy source for an unmanned underwater vehicle would appear to be a battery, since it can be operated in the absence of air. However, most batteries lack sufficient energy density to carry out the long missions associated with unmanned undersea vehicles, and the few batteries that might find application, for example lithium thionyl chloride, are prohibitively expensive. There continues to be a need for energy sources with a high energy density that can power unmanned undersea vehicles. These energy sources need to have long endurance, quiet operation, be relatively inexpensive, environmentally friendly, safe to operate, reusable, capable of a long shelf life and not prone to spontaneous chemical or electrochemical discharge.

In an effort to develop power sources for unmanned undersea vehicles with increased energy density, research has been directed towards semi fuel cells and fuel cells as one of several high energy density power sources being considered. For larger scale unmanned underwater vehicles, and longer duration missions, proton exchange membrane fuel cells and solid oxide fuel cells are being used because they can be completely re-fueled from both a fuel and oxidizer standpoint.

A key requirement for an unmanned underwater vehicle powered by a solid oxide fuel cell and maneuvering in shallow water in a surveillance mode is that its presence goes undetected. Stealthy operation of the unmanned underwater vehicle will depend, in part, on the reduction or elimination of any "signature" caused by the evolution of the product gas carbon dioxide, $CO_2$. Carbon dioxide, produced from the use of hydrocarbons in a solid oxide fuel cell must be contained and stored onboard the unmanned underwater vehicle. Since proton exchange fuel cells require pure hydrogen, $H_2$, for their operation, and release only water, $H_2O$, as a product, carbon dioxide is not an issue. However, proton exchange membrane fuel cells cannot run on hydrocarbon fuels because their platinum-metal catalysts will not tolerate any carbon monoxide, CO, that forms inside the fuel cell. For this reason, what is needed is a solid oxide fuel cell fuel system that offers an innovative solution to address carbon dioxide evolution.

SUMMARY OF THE INVENTION

It is a general purpose and object of the present invention to provide a power source for an unmanned undersea vehicle with increased energy density that employs a self-contained fuel system to address carbon dioxide evolution.

It is a further object to have a solid oxide fuel cell as the power source in the self-contained fuel system.

This object is accomplished by employing a chemical composite that when combined with water creates a fuel for the solid oxide fuel cell and a water soluble byproduct that can then be combined with the carbon dioxide gas generated by the fuel cell to create a storable solid precipitate.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
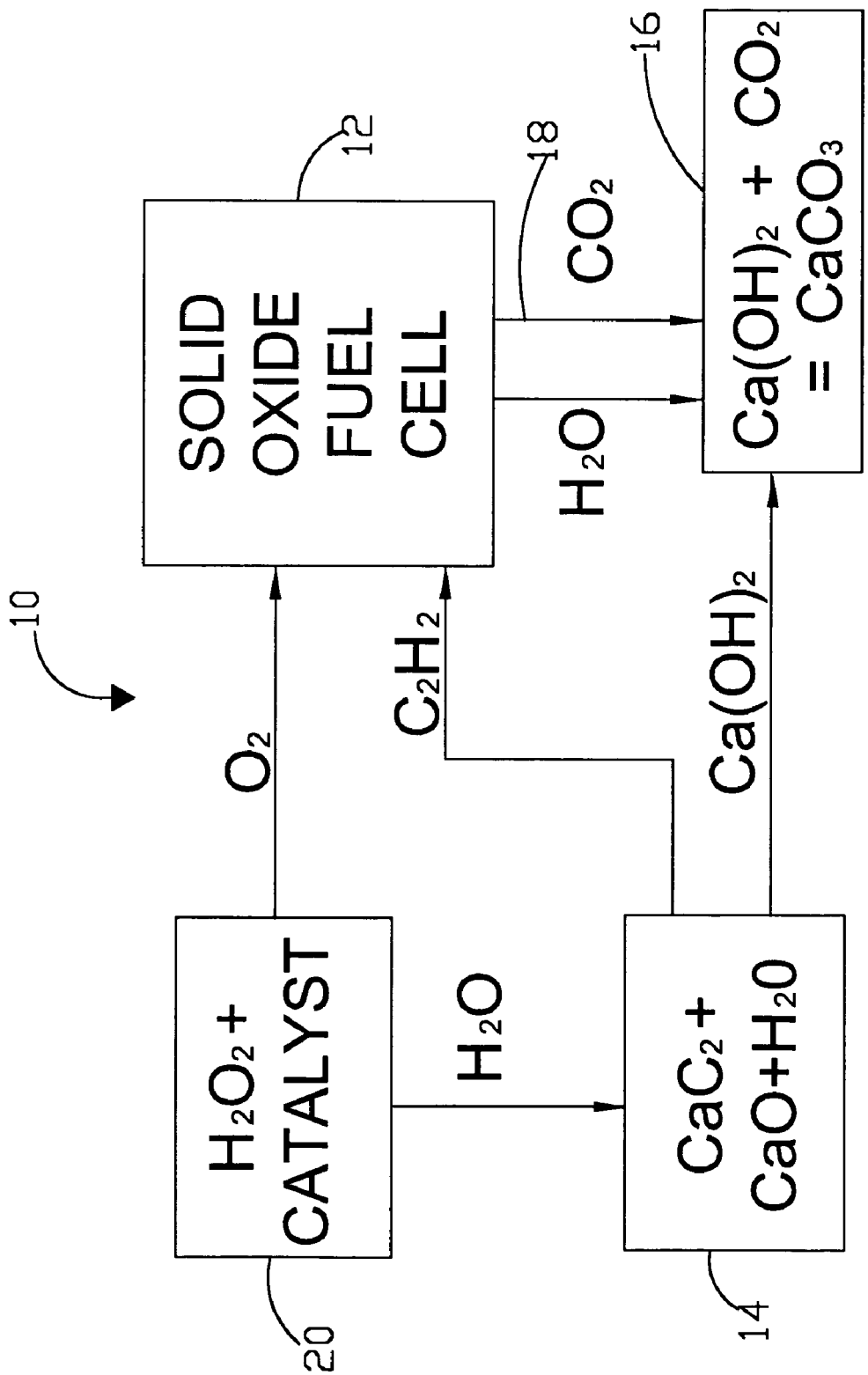
FIG. 1 is an illustration of the components of the self-contained fuel system of the present invention.

Referring now to FIG. 1 there is illustrated a unique fuel system 10 that is intended for use with a high-temperature fuel cell such as a solid oxide fuel cell 12. A solid chemical composite consisting of calcium carbide, $CaC_2$, and calcium oxide, CaO is reacted with water, $H_2O$, in a reaction chamber 14 connected to the solid oxide fuel cell 12, to generate acetylene gas, $C_2H_2$, and the byproduct calcium hydroxide, $Ca(OH)_2$. The chemical reactions are illustrated in equation (1):

$$CaC_2 + CaO + 3H_2O \Rightarrow C_2H_2 + 2Ca(OH)_2 \quad (1)$$

The byproduct calcium hydroxide, $Ca(OH)_2$ is directed to a precipitation chamber 16 connected to the reaction chamber 14 and solid oxide fuel cell 12. The acetylene gas, $C_2H_2$, is then either reformed to synthesis gases (CO and $H_2$) in a reformer, or is fed directly into the solid oxide fuel cell 12 where it can undergo electrochemical oxidization at the anode to produce water, $H_2O$, and carbon dioxide, $CO_2$, according to equation (2):

$$C_2H_2 + 5O^{2-} \Rightarrow 2CO_2 + H_2O + 10e^- \quad (2)$$

The $CO_2$ effluent is then directed via a hose 18 or some other device to the precipitation chamber 16 where it is reacted with $Ca(OH)_2$ to precipitate calcium carbonate, $CaCO_3$, which can then be stored in solid form. The chemical reactions are illustrated in equation (3):

$$Ca(OH)_2 + CO_2 \Rightarrow CaCO_3 + H_2O \quad (3)$$

The liquid oxidant, hydrogen peroxide, $H_2O_2$, can be used as the oxygen, $O_2$, source in equation (2) for the solid oxide fuel cell. The hydrogen peroxide, $H_2O_2$, is decomposed over the appropriate catalyst in a decomposition chamber 20 connected to the reaction chamber 14 and the solid oxide fuel cell 12, to produce water and oxygen according to the reaction illustrated in equation (4):

$$2H_2O_2 \Rightarrow 2H_2O + O_2 \quad (4)$$

The water, $H_2O$, formed by this reaction can be used in equation (1) to convert the composite consisting of calcium carbide, $CaC_2$, and calcium oxide, CaO, to acetylene, $C_2H_2$, and calcium hydroxide, $Ca(OH)_2$, hence eliminating the need for carrying an additional source of water, $H_2O$.

The advantage of the present invention over the prior art is that it is a self contained, zero-effluent fuel system with two distinct features: (1) it generates its own hydrocarbon fuel, acetylene, $C_2H_2$, and (2) it produces calcium hydroxide, $Ca(OH)_2$, which reacts with carbon dioxide gas, $CO_2$, to form a storable solid, calcium carbonate, $CaCO_3$. Since there is zero effluent, i.e. no carbon dioxide gas, $CO_2$, evolution to the underwater environment, buoyancy of the unmanned undersea vehicle is not affected. In addition, the fuel composite of calcium carbide, $CaC_2$, and calcium oxide, CaO is stored in solid form until it is converted to fuel upon demand.

In light of the above, it is therefore understood that within the scope of the appended claims, the invention may be practiced otherwise than as specifically described.

What is claimed is:

1. A fuel system for use with a fuel cell that releases carbon dioxide, $CO_2$, gas when operating, comprising:
   a solid chemical composite wherein said composite is reacted with water to generate a fuel for the fuel cell and a byproduct to be combined with said carbon dioxide, $CO_2$, gas;
   a precipitation chamber containing said byproduct; and
   a means for directing the carbon dioxide, $CO_2$, gas from the fuel cell into the precipitation chamber containing the byproduct wherein the carbon dioxide $CO_2$, gas is reacted with the byproduct to form a storable solid precipitate.

2. The fuel system of claim 1 further comprising:
   a liquid oxidant that is decomposed into water and oxygen wherein said water is reacted with the solid chemical composite and said oxygen is used in the fuel cell.

3. The fuel system of claim 1 wherein said solid chemical composite is calcium carbide, $CaC_2$, and calcium oxide, CaO.

4. The fuel system of claim 1 wherein said fuel is acetylene $C_2H_2$.

5. The fuel system of claim 1 wherein said byproduct is calcium hydroxide $Ca(OH)_2$.

6. The fuel system of claim 1 wherein said storable solid precipitate is calcium carbonate, $CaCO_3$.

7. The fuel system of claim 1 wherein said means for directing the carbon dioxide, $CO_2$, gas from the fuel cell into a precipitation chamber comprises a hose joining said fuel cell to said precipitation chamber.

8. The fuel system of claim 1 wherein said fuel cell is a high-temperature fuel cell.

9. A fuel system for an unmanned underwater vehicle for use with a high-temperature solid oxide fuel cell that releases carbon dioxide gas, $CO_2$, when operating, comprising:
   a quantity of hydrogen peroxide, $H_2O_2$, contained in a decomposition chamber, said hydrogen peroxide being decomposed over a catalyst to generate oxygen, $O_2$ for use with the solid oxide fuel cell, and water, $H_2O$;
   a solid chemical composite comprising calcium carbide, $CaC_2$, and calcium oxide, CaO, wherein the water, $H_2O$, formed by the decomposition of the hydrogen peroxide is reacted with the solid chemical composite to produce acetylene $C_2H_2$, for use as fuel for the solid oxide fuel cell and calcium hydroxide $Ca(OH)_2$, for use in reacting with said carbon dioxide, $CO_2$, gas; and
   a means for directing the carbon dioxide, $CO_2$, gas from the solid oxide fuel cell into a precipitation chamber containing the calcium hydroxide, $Ca(OH)_2$, wherein the carbon dioxide, $CO_2$, gas is reacted with the calcium hydroxide, $Ca(OH)_2$, to form a storable solid precipitate of calcium carbonate, $CaCO_3$.

10. A method for containing carbon dioxide, $CO_2$, gas in a fuel system having a fuel cell comprising the steps of:
    providing a solid chemical composite;
    reacting said solid chemical composite with water to produce a fuel for the fuel cell and a byproduct for use in reacting with the carbon dioxide, $CO_2$, gas;
    directing the byproduct to a precipitation chamber;
    feeding the fuel directly into the fuel cell;
    combining oxygen, $O_2$, with said fuel in the fuel cell thereby producing water, $H_2O$, and carbon dioxide, $CO_2$, gas;
    directing the carbon dioxide, $CO_2$, gas to the precipitation chamber; and
    reacting the byproduct with the carbon dioxide $CO_2$, gas to form a storable solid precipitate.

11. A method in accordance with claim 10 further comprising the initial steps of:
    providing a liquid oxidant; and
    decomposing said liquid oxidant over a catalyst to produce water and oxygen wherein said water is reacted with the solid chemical composite and said oxygen is used in the fuel cell.

12. A method in accordance with claim 10 wherein said solid chemical composite is calcium carbide, $CaC_2$, and calcium oxide, CaO.

13. A method in accordance with claim 10 wherein said fuel is acetylene $C_2H_2$.

14. A method in accordance with claim 10 wherein said byproduct is calcium hydroxide $Ca(OH)_2$.

15. A method in accordance with claim 10 wherein said storable solid precipitate is calcium carbonate, $CaCO_3$.

16. A method in accordance with claim 10 wherein said fuel cell is a high-temperature fuel cell.

* * * * *